United States Patent
Alsop et al.

(10) Patent No.: US 12,333,307 B2
(45) Date of Patent: Jun. 17, 2025

(54) APPROACH FOR MANAGING NEAR-MEMORY PROCESSING COMMANDS FROM MULTIPLE PROCESSOR THREADS TO PREVENT INTERFERENCE AT NEAR-MEMORY PROCESSING ELEMENTS

(71) Applicant: Advanced Micro Devices, Inc., Santa Clara, CA (US)

(72) Inventors: Johnathan Alsop, Bellevue, WA (US); Laurent S. White, Austin, TX (US); Shaizeen Aga, Santa Clara, CA (US)

(73) Assignee: Advanced Micro Devices, Inc., Sant Clara, CA (US)

( * ) Notice: Subject to any disclaimer, the term of this patent is extended or adjusted under 35 U.S.C. 154(b) by 0 days.

(21) Appl. No.: 17/853,613

(22) Filed: Jun. 29, 2022

(65) Prior Publication Data
US 2024/0004653 A1    Jan. 4, 2024

(51) Int. Cl.
*G06F 9/30* (2018.01)
*G06F 15/78* (2006.01)

(52) U.S. Cl.
CPC .......... *G06F 9/3009* (2013.01); *G06F 9/3004* (2013.01); *G06F 9/30101* (2013.01); *G06F 15/7821* (2013.01)

(58) Field of Classification Search
CPC .. G06F 9/3009; G06F 9/3004; G06F 9/30101; G06F 15/7821
See application file for complete search history.

(56) References Cited

U.S. PATENT DOCUMENTS

| | | | |
|---|---|---|---|
| 9,442,854 B2* | 9/2016 | Hyde | G06F 13/16 |
| 2011/0167222 A1* | 7/2011 | Lee | G06F 9/30087 |
| | | | 711/E12.017 |
| 2017/0344480 A1* | 11/2017 | Beard | G06F 12/0815 |

OTHER PUBLICATIONS

Giannoula et al.; SynCron: Efficient Synchronization Support for Near-Data-Processing Architectures; IEEE; 2021 (Year: 2021).*

* cited by examiner

*Primary Examiner* — Corey S Faherty
(74) *Attorney, Agent, or Firm* — Hickman Becker Bingham Ledesma LLP

(57) ABSTRACT

An approach is provided for managing near-memory processing commands ("PIM commands") from multiple processor threads in a manner to prevent interference and maintain correctness at near-memory processing elements. A memory controller uses thread identification information and last command information to issue a PIM command sequence from a first processor thread, directed to a PIM-enabled memory element, while deferring the issuance of PIM command sequences from other processor threads, directed to the same PIM-enabled memory element. After the last PIM command in the PIM command sequence for the first processor thread has been issued, a PIM command sequence for another processor thread is issued, and so on. The approach allows multiple processor threads to concurrently issue fine grained PIM commands to the same PIM-enabled memory element without having to be aware of address-to-memory element mapping, and without having to coordinate with other threads.

16 Claims, 4 Drawing Sheets

- A memory controller receives and enqueues PIM commands from multiple processor threads  102
- The memory controller selects and issues PIM commands in a PIM command sequence for an active processor thread while deferring issuance of PIM command sequences for other processor threads  104
- After the last PIM command in the PIM command sequence for the active processor thread has been issued, the memory controller selects and issues PIM commands in a PIM command sequence for another processor thread, and so on  106

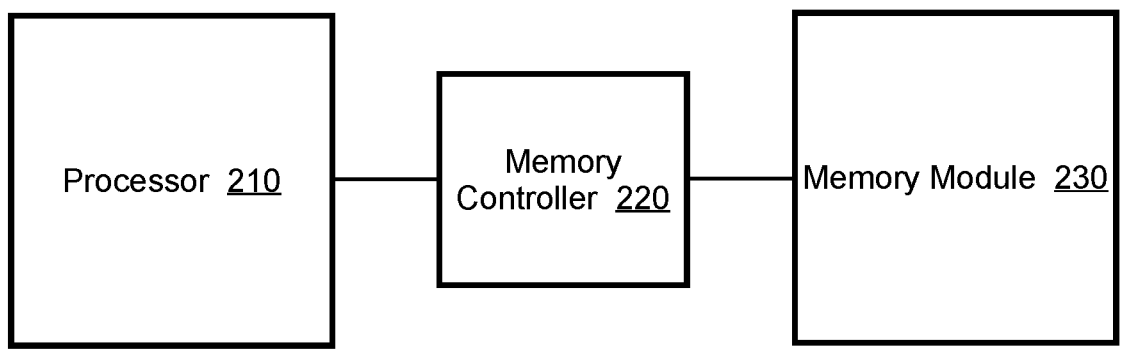

APPROACH FOR MANAGING NEAR-MEMORY PROCESSING COMMANDS FROM MULTIPLE PROCESSOR THREADS TO PREVENT INTERFERENCE AT NEAR-MEMORY PROCESSING ELEMENTS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

As computing throughput scales faster than memory bandwidth, various techniques have been developed to keep the growing computing capacity fed with data. Processing In Memory (PIM) incorporates processing capability within memory modules so that tasks can be processed directly within the memory modules. In the context of Dynamic Random-Access Memory (DRAM), an example PIM configuration includes vector compute elements and local registers. The vector compute elements and the local registers allow a memory module to perform some computations locally, such as arithmetic computations. This allows a memory controller to trigger local computations at multiple memory modules in parallel without requiring data movement across the memory module interface, which can greatly improve performance, particularly for data-intensive workloads. Examples of data-intensive workloads include machine learning, scientific simulations, and graph analytics.

One of the technical problems with PIM techniques is that when multiple processor threads issue PIM commands to the same PIM-enabled memory, there is a possibility of overwriting data in the local storage, e.g., registers, of near-memory processing elements, leading to errors, unless the issuance of the PIM commands is synchronized. For example, suppose that a first processor thread T0 issues a PIM command sequence that causes a near-memory processing element to load a value from a first memory location into a local register of the near-memory processing element, perform some computation using the value stored in the local register, and store the result back to memory. Suppose further that a second processor thread T1 also issues a PIM command to the same PIM-enabled memory that causes a value from a second memory location to be loaded into the same local register, overwriting the value stored by the first processor thread T0. If the value from the second memory location is loaded into the local register before the PIM command sequence from the first processor thread T0 is completed, an error may occur because the computation is performed on an incorrect value.

One solution to address this problem is for processor threads to synchronize with each other to ensure that they do not send PIM commands that reference the same near-memory processing registers. This solution is complex, however, because it requires that processor threads be aware of address-to-memory element mapping, e.g., address-to-bank mapping in the context of DRAM, which is a challenge for portability and programmability.

Another solution is to statically assign near-memory processing registers to processor threads. For example, a first portion of registers is assigned to processor thread T0, a second portion of registers is assigned to processor thread T1, etc. Near-memory processing elements use the first portion of registers to process PIM commands for the processor thread T0 and the second portion of registers PIM commands to process PIM commands for the processor thread T1. While this solution prevents different processor threads from overwriting values in the same near-memory processing element registers, it has several drawbacks. First, it requires that processor threads issue PIM commands only to their respective near-memory processing registers. Alternatively, a memory controller must translate and track registers on a per-processor thread basis. Both alternatives greatly increase complexity, limit the number of PIM registers that can be used by each processor thread, and can lead to underutilization and inefficiency during times when not all of the threads are active.

In view of the foregoing, there is therefore a need for an approach for implementing PIM techniques in a manner that does not suffer from the limitations of these and other solutions.

BRIEF DESCRIPTION OF THE DRAWINGS

Implementations are depicted by way of example, and not by way of limitation, in the figures of the accompanying drawings and in which like reference numerals refer to similar elements.

FIG. 1 is a flow diagram that depicts an overview of an approach for issuing PIM commands for multiple threads in a manner to prevent interference and maintain correctness at near-memory processing elements.

FIG. 2A is a block diagram that depicts an example computing architecture upon which the approach for managing PIM commands for multiple processor threads in a manner to prevent interference and maintain correctness at near-memory processing elements is implemented.

DETAILED DESCRIPTION

Figure 2B:
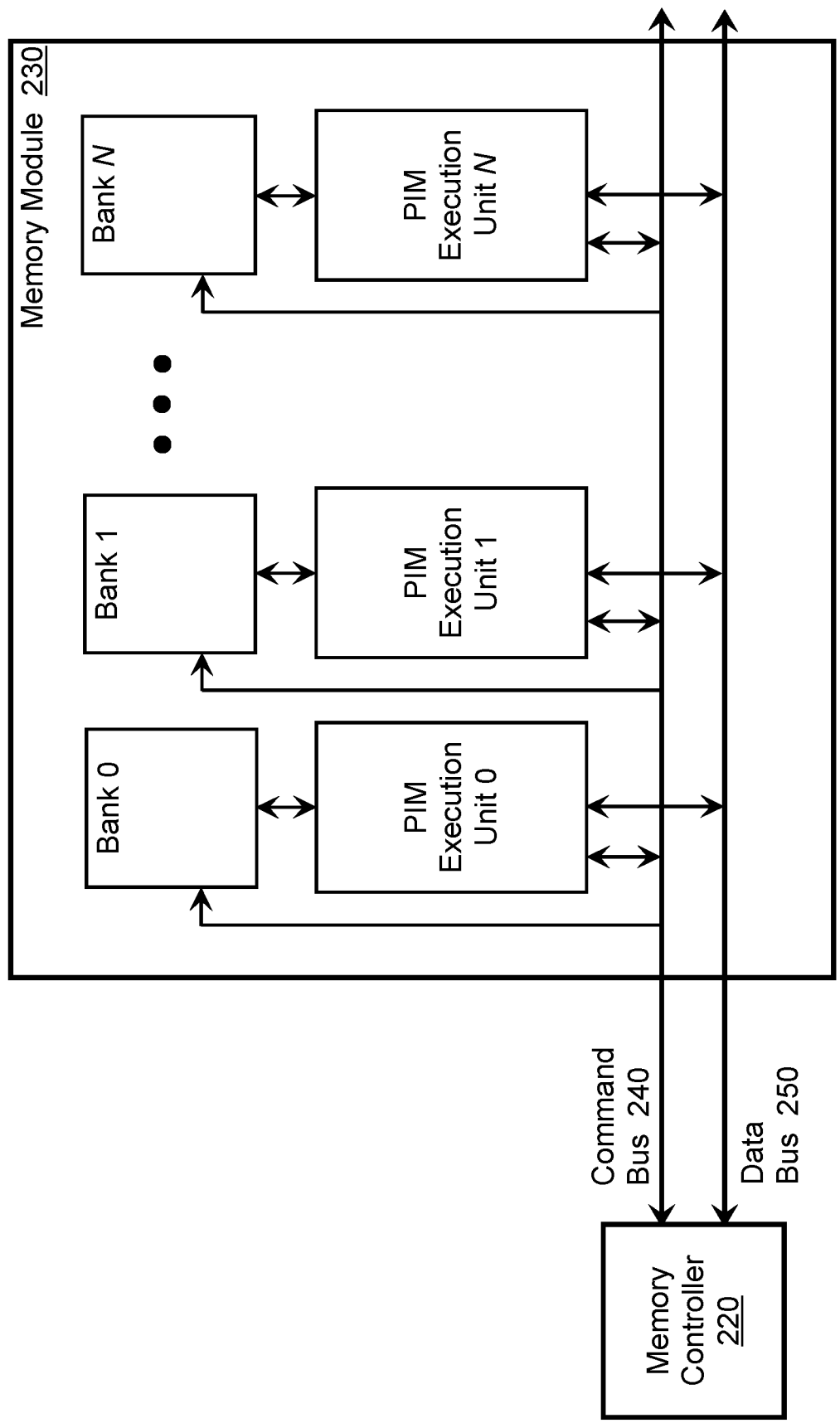
FIG. 2B depicts an example implementation of the memory module in the context of a PIM-enabled DRAM memory module communicatively coupled to the memory controller via a command bus and a data bus.

In the following description, for the purposes of explanation, numerous specific details are set forth in order to provide a thorough understanding of the implementations. It will be apparent, however, to one skilled in the art that the implementations may be practiced without these specific details. In other instances, well-known structures and devices are shown in block diagram form in order to avoid unnecessarily obscuring the implementations.

I. Overview
II. Architecture
III. Managing PIM Commands for Multiple Threads to Avoid Interference
   A. Introduction
   B. Issuing PIM Commands on a Thread-By-Thread Basis C. Determining Corresponding Processor Threads and Final PIM Commands
D. Preventing Command Queue Deadlock
E. Alternatives and Extensions

I. Overview

An approach is provided for managing near-memory processing commands, referred to herein as "PIM commands," from multiple processor threads in a manner to prevent interference and maintain correctness at near-memory processing elements. As used herein, the term "near-memory" refers to in or near a memory module, such as at caches, memory controllers, DRAM modules, etc. Also, the terms "processor thread" and "thread" are used interchangeably.

According to an implementation, a memory controller uses thread identification information and last command information to issue a PIM command sequence for an active processor thread, directed to a PIM-enabled memory element, while deferring the issuance of PIM command sequences from other processor threads, directed to the same PIM-enabled memory element. After the last PIM command in the PIM command sequence for the active processor thread has been issued, a PIM command sequence for another processor thread is issued, and so on. As used herein, the term "directed to" refers to "addressed to," after any required address translations are performed to determine a physical address. Also, the term "PIM command sequence" refers to a set of PIM commands that target a single memory element and are self-contained, i.e., they do not read any registers that they have not written to, and no PIM commands outside the PIM command sequence will read any registers written to by the PIM command sequence.

The approach allows multiple processor threads to concurrently issue fine-grained PIM commands to the same PIM-enabled memory element without having to be aware of address-to-memory element mapping, and without having to coordinate with other threads. For example, in the context of PIM-enabled DRAM, multiple processor threads can concurrently issue PIM commands that are directed to the same DRAM bank, and the memory controller manages the PIM commands in a manner to prevent data in near-memory processing element registers from being overwritten by different processor threads. This approach provides the technical benefits of improved resource utilization and efficiency, while eliminating the need for threads to be aware of address-to-memory element mapping or to coordinate with each other. For example, unlike an approach that partitions registers at near-memory processing elements on a per-processor thread basis, this solution makes all registers available to each processor thread, in turn.

Implementations are described herein in the context of memory controllers for purposes of explanation, but implementations are not limited to memory controllers and are applicable to any type of memory command processing element in a memory pipeline, such as caches, queues, buffers, etc.

FIG. 1 is a flow diagram 100 that depicts an overview of an approach for issuing PIM commands for multiple threads in a manner to prevent interference and maintain correctness at near-memory processing elements. In step 102, a memory controller receives and enqueues PIM commands for multiple processor threads. For example, the memory controller stores PIM commands for processor threads T0, T1 and T2, implemented on any number of hosts, in a command queue of the memory controller, and the PIM commands may be interleaved when received by the memory controller.

In step 104, the memory controller selects and issues a PIM command sequence for an active processor thread while deferring issuance of PIM command sequences for other processor threads. For example, the memory controller selects a PIM command sequence for processor thread T0 and defers issuing PIM command sequences for processor threads T1 and T2. As described in more detail hereinafter, the memory controller selects a PIM command in the command queue (selection may be based on age, request priority, fairness/QoS, and/or other factors), determines a corresponding processor thread for the selected PIM command, and issues all of the PIM commands in the PIM command sequence for that processor thread, "the active processor thread," while deferring issuance of PIM commands for other threads. The corresponding processor thread is determined, for example, by information in the PIM command, such as one or more bit values.

If information about the registers accessed by commands in a PIM sequence are available, or can be inferred at the memory controller, then according to an implementation PIM commands from threads are deferred if they access registers used by a different active thread. For example, the active thread can be tracked at the granularity of one or more PIM registers, and deferral is performed when a PIM sequence tries to access a register which is currently assigned to a different active thread. If two PIM sequences are known to access disjoint registers, they may be interleaved.

Continuing with the present example, the memory controller issues the PIM commands in the PIM command sequence for processor thread T0, while deferring issuance of PIM commands for processor threads T1 and T2. As described in more detail hereinafter, deferred PIM commands are moved to a separate storage, for example, in the memory controller, in memory, or other locations accessible to the memory controller. Alternatively, deferred PIM commands remain in the command queue of the memory controller but are skipped.

In step 106, after the last PIM command in the PIM command sequence for the active processor thread has been issued, the memory controller selects and issues PIM commands in a PIM command sequence for another processor thread, and so on. In the present example, after the memory controller has issued the last PIM command in the PIM command sequence for the active processor thread, e.g., thread T0, the memory controller selects and issues PIM commands in a PIM command sequence for another processor thread, such as processor thread T1 or T2 in the present example. The process of FIG. 1 is repeated any number of times as new PIM commands are received and enqueued at the memory controller.

II. Architecture

FIG. 2A is a block diagram that depicts an example computing architecture 200 upon which the approach for managing PIM commands for multiple processor threads in a manner to prevent interference and maintain correctness at near-memory processing elements is implemented. The computing architecture 200 includes a processor 210, a memory controller 220, and a memory module 230. The computing architecture 200 includes fewer, additional, and/or different elements depending upon a particular implementation. In addition, implementations are applicable to computing architectures 200 with any number of processors, memory controllers and memory modules.

The processor 210 is any type of processor, such as a Central Processing Unit (CPU), a Graphics Processing Unit (GPU), an Application-Specific Integrated Circuit (ASIC), a Field-Programmable Logic Array (FPGA), an accelerator, a Digital Signal Processor (DSP), etc. The processor 210 is a single or multi-core processor with any number of and types of threads executing thereon. The memory module 230 is any type of memory module, such as a Dynamic Random Access Memory (DRAM) module, a Static Random Access Memory (SRAM) module, etc. According to an implementation, and as described in more detail hereinafter, the memory module 230 is a PIM-enabled memory module.

The memory controller 220 manages the flow of data between the processor 210 and the memory module 230 and is implemented as a stand-alone element or implemented in the processor 210, for example on a separate die from the processor 210, on the same die but separate from the processor, or integrated into the processor circuitry as an integrated memory controller. The memory controller 220 is depicted in the figures and described herein as a separate element for explanation purposes.

FIG. 2B depicts an example implementation of the memory module 230 in the context of a PIM-enabled DRAM memory module communicatively coupled to the memory controller 220 via a command bus 240 and a data bus 250. The PIM-enabled DRAM memory module includes N number of banks, where each bank includes a corresponding PIM execution unit. Implementations are not limited to each bank having a corresponding PIM execution unit and include PIM execution units that service more than one bank. Each PIM execution unit includes processing logic and local storage in the form of registers for performing local computations. As used herein, the term "register" refers to any local storage used by a near-memory processing element and example implementations of a register include, without limitation, register in a register file, a local cache, a queue, a buffer, etc. The memory module 230 includes fewer or additional elements that vary depending upon a particular implementation.

Figure 2C:
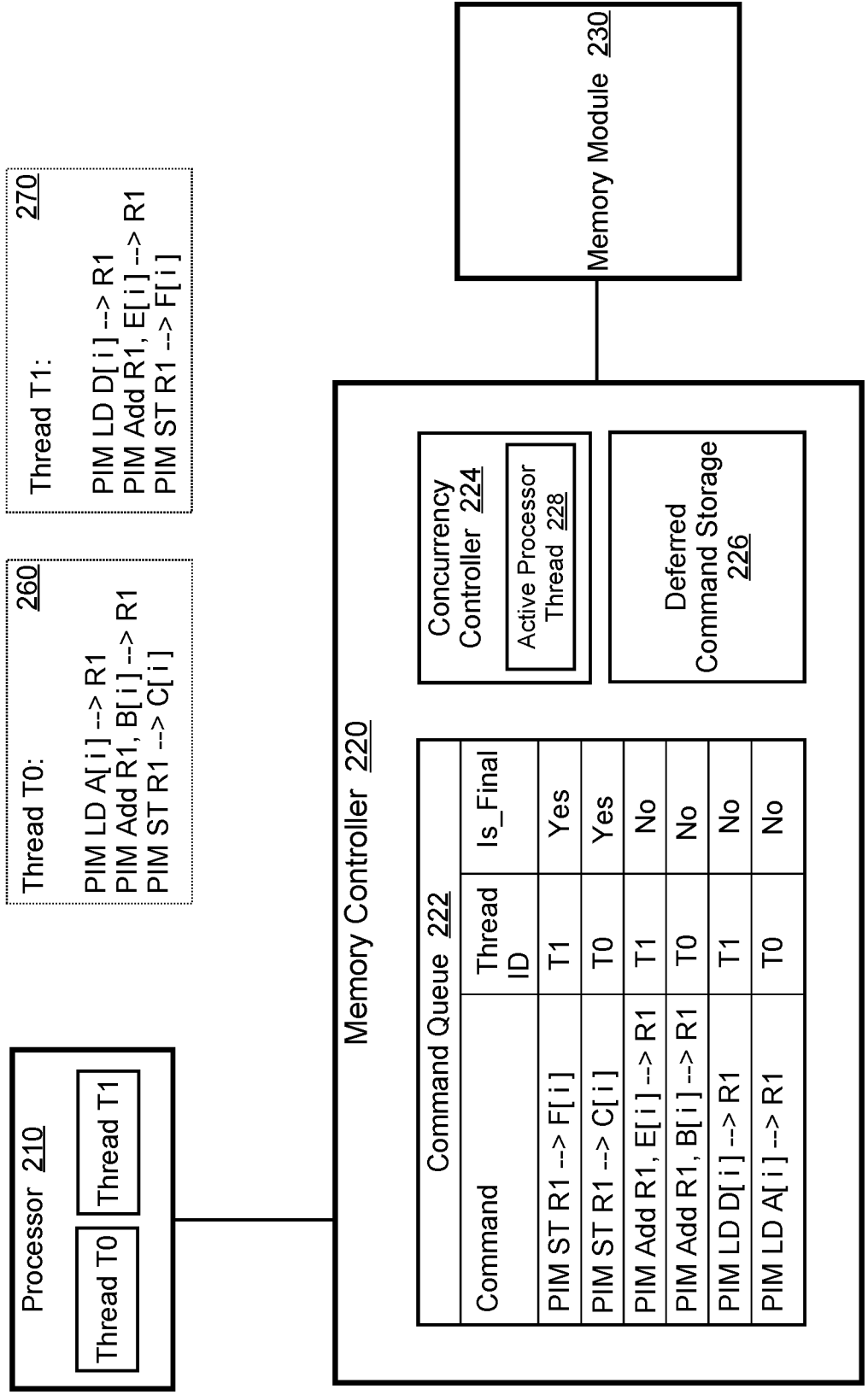
FIG. 2C depicts an example implementation of the computing architecture. In this example, the memory controller includes a command queue, a concurrency controller and a deferred command storage.

FIG. 2C depicts an example implementation of the computing architecture 200. In this example, the memory controller 220 includes a command queue 222, a concurrency controller 224 and a deferred command storage 226. The memory controller 220 includes fewer or additional elements, such as a scheduler, page table, etc., that vary depending upon a particular implementation and that are not depicted in the figures and described herein for purposes of explanation. In addition, the functionality provided by the various elements of the memory controller 220 are combinable in any manner, depending upon a particular implementation.

The command queue 222 stores commands, including PIM and non-PIM commands, received by the memory controller 220, for example from one or more threads executing on the processor 210. PIM commands are directed to one or more memory elements in a memory module, such as one or more banks in a DRAM module. The target memory elements are specified by one or more bit values, such as a bit mask and specify any number, including all, of the available target memory elements. Alternatively, no bit mask is used, and PIM commands are directed to all memory elements in the memory module 230, such as a logical operation and/or a computation. As one non-limiting example, a PIM command specifies that at each target bank, a value is read from memory at a specified row and column into a local register, an arithmetic operation performed on the value, and the result stored back to memory.

In the example depicted in FIG. 2C, the command queue 222 stores data that indicates a corresponding processor thread ("Thread ID") and whether a PIM command is the final PIM command in a PIM command sequence ("Is_Final"). As described in more detail hereinafter, this information may be explicitly indicated in a PIM command, for example by one or more bits, or determined from other information in a PIM command, such as address information. This information is used to issue PIM commands on a processor thread-by-processor thread basis to avoid interference, as described in more detail hereinafter.

Non-PIM commands include memory commands, such as load (read) commands, store (write) commands, etc. Unlike PIM commands that may be directed to multiple target banks, non-PIM commands are typically directed to a single bank, i.e., are bank specific.

The command queue 222 is implemented by any type of storage capable of storing memory commands, such as registers, a local cache, a buffer, etc. Although implementations are depicted in the figures and described herein in the context of the command queue 222 being implemented as a single element, implementations are not limited to this example and according to an implementation, the command queue 222 is implemented by multiple elements. For example, a separate command queue is used for each type of memory command, e.g., one command queue for PIM commands and a separate command queue for non-PIM commands. As another example, a separate command queue is assigned to each memory element, e.g., a separate command queue is assigned to each bank in the memory module 230, etc.

The concurrency controller 224 manages PIM commands for multiple processor threads in a manner to prevent interference and maintain correctness at near-memory processing elements as described in more detail hereinafter. The concurrency controller 224 is implemented by hardware elements, software elements, or any combination of hardware elements and software elements. The concurrency controller 224 is depicted in the figures and described herein as a separate element for explanation purposes only and the functionality of the concurrency controller 224 may be implemented anywhere in the memory controller 220, for example, in a scheduler or other processing logic in the memory controller 220.

The deferred command storage 226 is local storage on or near the memory controller 220 for storing deferred PIM commands. The deferred command storage 226 is implemented any type of storage capable of storing memory commands, such as registers, a local cache, a buffer, etc. One example implementation is a buffer implemented in an on-chip Static Random Access Memory (SRAM).

III. Managing PIM Commands for Multiple Threads to Avoid Interference

A. Introduction

In the example implementation of the computing architecture 200 of FIG. 2C, the processor 210 includes two processor threads, indicated as "Thread T0" and "Thread T1." The two Threads T0, T1 execute on the same core or on different cores, depending upon a particular implementation.

As depicted in FIG. 2C, Thread T0 implements a PIM command sequence 260 with three PIM commands. The first PIM command in the PIM command sequence 260 causes the value at the memory location A[i] to be loaded into register R1, which is a local register at the PIM execution unit where the first PIM command is processed. The second PIM command in the PIM command sequence 260 causes the value in register R1 to be added to the value at the memory location B[i] and the result stored in register R1. The third PIM command in the PIM command sequence 260 causes the result stored in register R1 to be stored to the memory location C[i]. In this example, the "A," "B," and "C" notation refers to arrays in memory where "i" is a value, e.g., an integer value that may be, for example, incremented or decremented on repeated invocations. Implementations are not limited to any particular types of PIM commands, formats, or notation, and they may vary depending upon a particular implementation. Thread T1 implements a PIM command sequence 270 with three PIM commands, similar to the PIM command sequence 260 for Thread T0.

Given that both PIM command sequences 260, 270 for Threads T0, T1, respectively, include PIM commands that reference local register R1, then there is the possibility of data in the register R1 being overwritten by a different thread, causing errors, depending upon how the PIM commands are issued. For example, suppose that the PIM commands of the PIM command sequences 260, 270 were received and enqueued in the command queue 222 in interleaved fashion by the memory controller 220. As depicted in FIG. 2C, the PIM LD A[i]→R1 command of Thread T0 was first enqueued into the command queue 222 followed by the PIM LD D[i]→R1 command of Thread T1, etc. If these PIM commands are issued in the order in which they were enqueued, i.e., first the PIM LD A[i]→R1 command of Thread T0 followed by the PIM LD D[i]→R1 command of Thread T1, the value in register R1 will be overwritten, possibly causing an error. Note that this presumes that the memory locations D[i] and A[i] are in the same memory element, e.g., the same DRAM bank, so that the same near-memory processing element, e.g., the same PIM Execution Unit processes both commands.

B. Issuing PIM Commands on a Thread-by-Thread Basis

According to an implementation, a technical solution to the aforementioned interference problem is provided by the concurrency controller 224 issuing PIM commands on a processor thread-by-processor thread basis. The concurrency controller 224 selects a first PIM command from the command queue 222, e.g., the oldest PIM command in the command queue 222, determines the corresponding processor thread, and then issues all of the PIM commands in a PIM command sequence for the processor thread, while deferring the issuance of PIM commands for other processor threads. The concurrency controller 224 then repeats this process for other processor threads, one at a time, while deferring the issuance of PIM commands for non-selected processor threads. This prevents PIM commands for different processor threads that are directed to the same near-memory processing element from interfering with each other.

Figure 3:
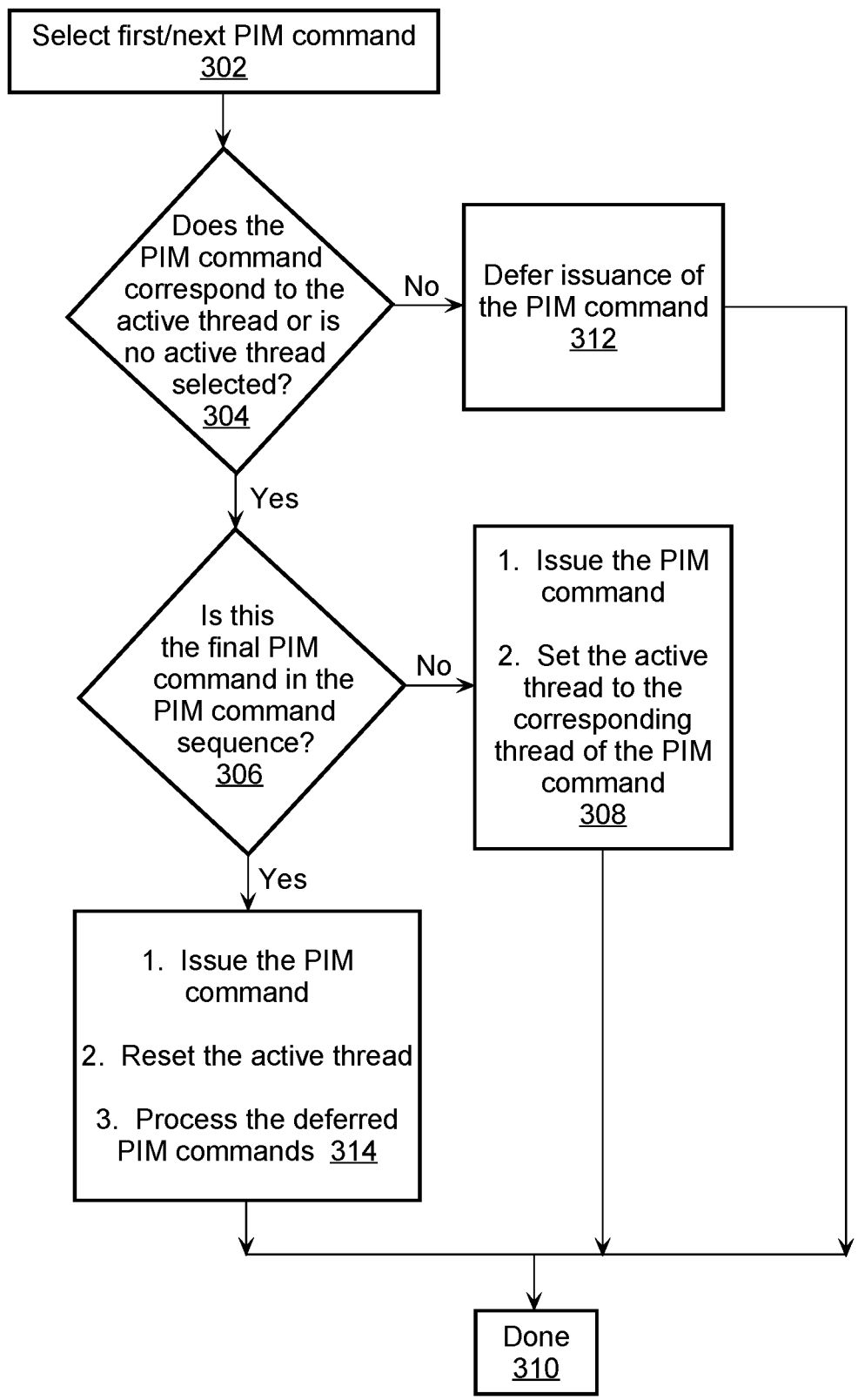
FIG. 3 is a flow diagram that depicts an approach for avoiding interference between PIM commands issued by different processor threads that are directed to the same register at a near-memory processing element by issuing PIM commands on a processor thread-by-processor thread basis.

FIG. 3 is a flow diagram 300 that depicts an approach for avoiding interference between PIM commands issued by different processor threads that are directed to the same register at a near-memory processing element by issuing PIM commands on a processor thread-by-processor thread basis.

Starting in step 302, a first/next PIM command is selected. For example, the concurrency controller 224 selects the first PIM command, i.e., the oldest PIM command, from the command queue 222. In the present example, the oldest PIM command is the PIM LD A[i]→R1 command that corresponds to thread T0.

In step 304, a determination is made whether the selected PIM command corresponds to the current thread or whether no current thread is selected. In this example, it is presumed that no current thread is selected, so control proceeds to step 306 where a determination is made whether the selected PIM command is the final PIM command in the PIM command sequence. The concurrency controller 224 makes this determination by checking the "Is_Final" value for the selected PIM command in the command queue 222. In the present example, the selected PIM command PIM LD A[i]→R1 is not the final PIM command in the PIM command sequence, so control proceeds to step 308.

In step 308, the selected PIM command is issued, and the current thread is set to the corresponding thread of the selected PIM command. For example, the concurrency controller 224 causes the selected PIM command to be issued via a scheduler in the memory controller 220. The concurrency controller 224 also updates the active processor thread 228 value to thread T0. Other steps may also be performed, such as deleting the current PIM command, i.e., the PIM LD A[i]→R1 command, from the command queue 222 or advancing a current command pointer to the next PIM command in the command queue 222 and later deleting the current PIM command during an idle period or while performing housekeeping tasks, etc., depending upon a particular implementation. The process is then complete in step 310 for the first selected PIM command.

The process is repeated for other PIM commands in the command queue 222 to issue the remaining PIM commands in the PIM command sequence for the active processor thread while deferring PIM commands for other processor threads that have PIM commands directed to the same memory element. Returning to step 302, a next PIM command is selected. Continuing with the present example, the concurrency controller 224 selects next oldest PIM command, i.e., the PIM LD D[i]→R1 command that corresponds to thread T1. Since this PIM command corresponds to a different processor thread, i.e., processor thread T1, than the active processor thread T0, issuance of the PIM command will be deferred, as described hereinafter.

In step 304, a determination is made whether the selected PIM command corresponds to the active processor thread or whether no active processor thread is selected. In the first iteration described above, the active processor thread was set to thread T0 in step 308, so in step 304, the determination is whether the current PIM command, i.e., the PIM LD D[i]→R1 command, corresponds to thread T0. As indicated by the command queue 222, the PIM LD D[i]→R1 command corresponds to thread T1, so control proceeds to step 312 and the issuance of the PIM LD D[i]→R1 command is deferred. This prevents the PIM LD D[i]→R1 command from overwriting the value previously stored in the register R1 by the PIM LD A[i]→R1 command.

Deferring the issuance of PIM commands is accomplished in different ways, depending upon a particular implementation. According to an implementation, deferred PIM commands are moved from the command queue 222 to the deferred command storage 226, maintaining the same order as the command queue 222. This includes deleting the deferred PIM commands from the command queue 222 to free up space for other commands. In the present example, the PIM LD D[i]→R1 command is moved from the command queue 222 to the deferred command storage 226 and then deleted from the command queue 222. Various techniques for managing the deferred command storage 226 are described in more detail hereinafter.

According to another implementation, deferring issuance of a PIM command is accomplished by advancing a current command pointer to the next command in the command queue 222 to skip the PIM command, while leaving the deferred PIM command in the command queue 222. In the present example, the current command pointer is advanced from the PIM LD D[i]→R1 command to the PIM Add R1, B[i]→R1 command, which corresponds to the processor thread T0. Note that deferring the issuance of PIM commands for non-active processor threads may result in a deadlock of the command queue 222. Techniques for preventing deadlocks are described in more detail hereinafter. Alternatively, a PIM command is deferred by reordering PIM commands in the command queue 222, e.g., by reordering the PIM command to be deferred to another location in the command queue 222. Once issuance of the selected PIM command has been deferred, the process is then complete in step 310.

The process of FIG. 3 is repeated for other PIM commands in the command queue 222. In the present example, this results in PIM commands that correspond to thread T0 being issued while PIM commands for other threads, e.g., thread T1, are deferred. Eventually, a final PIM command for the current thread T0 is selected for processing from the command queue 222, which is now described.

Returning to step 302, the PIM ST R1→C[i] command is selected which is the last PIM command in the current PIM command sequence for thread T0, as indicated by the "Is_Final" value of "Yes" in the command queue 222. In step 304, since this command corresponds to the current thread of T0, control proceeds to step 306 where a determination is made whether the selected PIM command is the final PIM command in the PIM command sequence. Since the PIM ST R1→C[i] command is the final command in the current PIM command sequence, control proceeds to step 314 and three actions are performed. The current PIM command is issued, the current thread is reset, e.g., the active processor thread 228 value is set to a Null value, and the deferred PIM commands are processed. As before, the concurrency controller 224 causes the current PIM command to be issued via a scheduler in the memory controller 220, which in this case is the last PIM command in the PIM command sequence for thread T0. Control then proceeds to step 310 and the processing of the PIM command sequence for thread T0 is complete.

According to an implementation, processing deferred PIM commands includes moving the deferred PIM commands from the deferred command storage 226 back to the command queue 222, while maintaining the same order so that the oldest PIM command in the deferred command storage 226 becomes the next PIM command to be processed. In the present example, the three PIM commands for thread T1 are moved from the deferred command storage 226 back to the command queue 222 and processing starts with the oldest command, i.e., PIM LD D[i]→R1. Alternatively, if deferred PIM commands are maintained in the command queue 222 and skipped by advancing a current command pointer, the current command pointer is updated to point to the current PIM command, i.e., the PIM LD D[i]→R1 command. The process of FIG. 3 is performed on the three thread T1 PIM commands in the command queue 222 causing them to be issued in order, followed by other PIM commands in the command queue 222.

C. Determining Corresponding Processor Threads and Final PIM Commands

The concurrency controller 224 determines a corresponding processor thread for a PIM command using a variety of techniques that vary depending upon a particular implementation. According to one implementation, a PIM command includes data, such as one or more bit values, that indicates a corresponding processor thread, for example via mapping data. The bit values may be manually set by a software developer, for example when creating thread code.

Alternatively, the bit values are set by a compiler during compilation or at runtime based upon address information in a PIM command. For example, memory and/or command register files may be partitioned by processor thread, i.e., each processor thread is assigned an address range (or multiple address ranges) and/or a portion of a command register file. The address information or request command index in a PIM command is then used to determine the corresponding processor thread.

According to another implementation, corresponding processor threads are specified via PIM command metadata that is supplied with PIM commands or separate from PIM commands. Alternatively, PIM command metadata is provided for groups of PIM commands.

The concurrency controller 224 also determines whether a PIM command is the final PIM command in a PIM command sequence. According to an implementation, a PIM command indicates whether the PIM command is the final PIM command in a PIM command sequence. For example, one or more bits in a PIM command specify whether the PIM command is the final PIM command in a PIM command sequence. The bits are specified, for example, by a software developer when processor thread code is created, by a compiler during dataflow analysis, or by one or more command index bits. For example, data flow analysis confirms that a register will not be read again before it is written and is able to classify the corresponding PIM command as the final PIM command in a PIM command sequence.

D. Preventing Command Queue Deadlock

It is possible for a deadlock to occur with the command queue 222 in a circumstance where: 1) the command queue 222 is full; 2) there are no remaining PIM commands in the command queue 222 that correspond to the active processor thread, including the final PIM command in the PIM command sequence for the active processor thread; and 3) either the technique of advancing the current command pointer is used for deferring PIM commands or where the deferred command storage 226 is used to defer PIM commands, the deferred command storage 226 is full. For example, suppose that the active processor thread is T0, the command queue 222 is full and all of the remaining PIM commands in the command queue 222 correspond to the processor thread T1. In this situation, if either the technique of advancing the current command pointer is used for deferring PIM commands or the deferred command storage 226 is full, then no further PIM commands can be processed to free up space in the command queue 222, resulting in a deadlock.

Several implementations are provided for avoiding command queue deadlock. It is first noted that deferring the issuance of PIM commands using the technique of advancing the current command pointer for the command queue 222 may more quickly result in a deadlock since deferred PIM commands are not removed from the command queue 222 into the deferred command storage 226. Rather, deferred PIM commands remain in the command queue 222 and are skipped by advancing the current command pointer.

Therefore, according to an implementation, when this technique for deferring the issuance of PIM commands is used, the deferral mechanism is switched from advancing the current command queue to using the deferred command storage 226, as previously described herein, when less than a specified number of slots are available in the command queue 222. For example, the concurrency controller 224 monitors the number of available slots in the command queue 222 and when that number falls below a specified threshold, the concurrency controller 224 switches to using the deferred command storage 226 method as previously described herein. This includes the concurrency controller 224 moving the deferred PIM commands from the command queue 222 to the deferred command storage 226, maintaining the order, i.e., the PIM commands in the command queue 222 that were skipped by advancing the current command pointer. For example, suppose that the current process thread is T0 and there are several PIM commands that correspond to process thread T1 in the command queue 222 that have been skipped by advancing the current command pointer. Those PIM commands are moved from the command queue 222 to the deferred command storage 226 and deleted from the command queue 222. The concurrency controller 224 then resumes processing PIM commands in the command queue 222 but defers the issuance of PIM commands that correspond to processor thread T1 by moving them into the deferred command storage 226, maintaining the order, as previously described herein. According to an implementation, the specified threshold is implemented as a configuration parameter in the concurrency controller 224, but other techniques may be used. For example, the specified threshold may be specified by a special PIM command or as a new semantic for an existing PIM command. This implementation also includes resuming using the current command pointer to defer the issuance of PIM commands when the number of available slots in the command queue 222 grows to exceed another threshold.

The deferred command storage 226 may be implemented by any type of local storage on or near the memory controller 220. The size of the deferred command storage 226 is configured based upon a variety of factors, such as an expected number of processor threads issuing PIM commands to the same PIM-enabled memory module, an expected size of PIM command sequences, etc. In situations when the deferred command storage 226 is used for deferring PIM commands and the actual number of processor threads issuing PIM commands to the same PIM-enabled memory module is greater than expected, or when the actual size of PIM command sequences is larger than expected, the deferred command storage 226 may have an insufficient number of entries to hold all of the deferred PIM commands. When the deferred command storage 226 becomes full, no further PIM commands can be deferred from the command queue 222 and a deadlock of the command queue 222 may occur.

According to an implementation, when using the deferred command storage 226 to store deferred PIM commands, the concurrency controller 224 is configured to generate a warning message when the number of remaining available entries in the deferred command storage 226 falls below a specified threshold, when there are no remaining entries in the deferred command storage 226, or both. According to another implementation, when there are no remaining entries in the deferred command storage 226, deferred PIM commands are "spilled over" to memory, e.g., DRAM or on-chip SRAM, etc. For example, a particular portion of memory is designated for use by the concurrency controller 224 and the concurrency controller 224 is configured to use the designated portion of memory to store deferred PIM commands when the deferred command storage 226 is full. The concurrency controller 224 then reloads the deferred PIM commands from memory (and the deferred command storage 226) into the command queue 222 after the last PIM command in a PIM command sequence for the active processor thread has been issued.

In many situations, PIM command sequences are relatively short and the final PIM command in a PIM command sequence is issued before the command queue 222 becomes full. In other situations, however, it is possible that the final PIM command in a PIM command sequence is not issued before the command queue 222 becomes full. This may occur for a variety of reasons, for example, a PIM command sequence is unusually long or the final PIM command in a PIM command sequence is delays. According to an implementation, deadlock of the command queue 222 is avoided by checkpointing the PIM command sequence for the active processor thread when the number of available slots in the command queue 222 falls below a specified threshold and another processor thread is selected for processing. For example, suppose that the active processor thread is T0 and the number of available slots in the command queue 222 falls below a specified threshold, indicating that the command queue 222 may become deadlocked before the PIM command sequence for the active processor thread T0 is completed. To avoid deadlock, the active processor thread T0 is checkpointed by storing the values in near-processing local storage to memory, or some other storage. For example, the concurrency controller 224 issues commands to store the values in near-memory processing registers to memory and the memory controller 220 ensures that those memory locations are not overwritten. Another processor thread is selected to be the active processor thread and the PIM commands for that processor thread are processed as described herein. After that processor thread has completed, the checkpointed processor thread is selected as the active processor thread and register values for that processor thread that were saved to memory are reloaded into the registers of the near-memory processing element and processing of the PIM command sequence for that processor thread then resumes. This may be repeated for any number of processor threads as necessary to prevent the command queue 222 from becoming deadlocked.

E. Alternatives and Extensions

Implementations are described herein in the context of the concurrency controller 224 managing two processor threads T0, T1 for purposes of explanation, but implementations are applicable to any number of processor threads. For example, suppose that the processor 210 has four threads T0-T3 executing thereon, on any number of cores, and that all four processor threads T0-T3 issue PIM commands directed to the same PIM-enabled memory module. Suppose further that at least some of the PIM commands are received by the memory controller 220 in interleaved fashion and that a PIM command for the processor thread T0 is the oldest PIM command in the command queue 222, making the processor thread T0 the active processor thread. PIM commands for the other processor threads T1-T3 are moved to the deferred command storage 226, maintaining order. After the final PIM command in the PIM command sequence for the processor thread T0 has been issued, the PIM commands for the other processor threads T1-T3 are moved from the deferred command storage 226 back to the command queue 222, maintaining the order. The process of FIG. 3 then resumes, starting with the oldest PIM command in the command queue 222. According to an implementation, PIM commands are issued from the deferred command storage 226 when the number of PIM commands in the deferred command storage 226 exceeds a specified threshold.

Implementations are described herein in the context of a single active processor thread for purposes of explanation, but implementations are applicable to multiple active processor threads, depending upon the particular near-memory processing architecture. For example, in the situation where a memory module has a single logic element with local storage for performing near-memory computations, then a single active processor thread is used as described herein. As another example, suppose that a memory module has N number of logic elements with local storage for performing near-memory computations. In this example, the concurrency controller 224 manages N number of active processor threads, one for each of the N number of logic elements, since each of the N number of logic elements has its own local storage.

Also, although implementations are depicted in the figures and described herein in the context of the command queue 222 containing only PIM commands, this is done for explanation purposes only and the command queue 222 may include non-PIM commands, for example memory commands such as load and store commands. These commands may be interleaved with the PIM commands in the command queue 222 and are issued in order without any interference with PIM commands since they do not access local storage used by near-memory processing elements.

According to an implementation, software support is provided for enabling/disabling the functionality described herein. This includes a special command or new semantics to an existing command for enabling or disabling the memory controller functionality described herein. This allows implementations that do not need the concurrency described herein or where PIM commands do not include the corresponding thread and final PIM command information to disable the functionality.

The invention claimed is:

1. A memory controller configured to:
issue one or more near-memory processing commands for a first processor thread; and
defer issuance of one or more near-memory processing commands for a second processor thread by performing one of:
moving the one or more near-memory processing commands for the second processor thread into deferred command storage, or
changing a pointer to skip the one or more near-memory processing commands for the second processor thread;
wherein the one or more near-memory processing commands for the first processor thread and the one or more near-memory processing commands for the second processor thread are directed to a same memory element.

2. The memory controller of claim 1, wherein the one or more near-memory processing commands for the first processor thread are at least partially interleaved with the one or more near-memory processing commands for the second processor thread when received by the memory controller.

3. The memory controller of claim 1, wherein one or more bit values in the one or more near-memory processing commands are set based upon address information in the one or more near-memory processing commands.

4. The memory controller of claim 1, wherein the one or more near-memory processing commands contains one or more command bit values.

5. The memory controller of claim 1, further configured to issue the one or more near-memory processing commands for the second processor thread after all of the near-memory processing commands in a near-memory processing command sequence for the first processor thread have been issued.

6. The memory controller of claim 5, further configured to identify a last near-memory processing command in the one or more near-memory processing commands for the first processor thread based upon one or more of: one or more bit values in the last near-memory processing command or a near-memory processing command that is designated as the last near-memory processing command for the first processor thread.

7. The memory controller of claim 1, further configured to:
cause a data stored in a local storage of a near-memory processing element for the first processor thread to be stored to an other location,
upon completion of a near-memory processing command sequence for a third processor thread:
cause the data that was stored in the other location to be reloaded into the local storage of the near-memory processing element for the first processor thread, and
resume processing of the one or more near-memory processing commands for the first processor thread.

8. The memory controller of claim 1, wherein said same memory element is one or more registers.

9. The memory controller of claim 1, wherein the memory controller comprises one or more of a cache, a queue, or a buffer.

10. A processor comprising:
a first processor thread;
a second processor thread; and
a memory controller configured to:
issue one or more near-memory processing commands for a first processor thread; and
defer issuance of one or more near-memory processing commands for a second processor thread by performing one of:
moving the one or more near-memory processing commands for the second processor thread into deferred command storage, or
changing a pointer to skip the one or more near-memory processing commands for the second processor thread;
wherein the one or more near-memory processing commands for the first processor thread and the one or more near-memory processing commands for the second processor thread are directed to a same memory element.

11. The processor of claim 10, wherein the one or more near-memory processing commands for the first processor thread are at least partially interleaved with the one or more near-memory processing commands for the second processor thread when received by the memory controller.

12. The processor of claim 10, wherein one or more bit values in the one or more near-memory processing commands are set based upon address information in the one or more near-memory processing commands or are one or more command bit values.

13. The processor of claim 10, wherein the memory controller is further configured to issue the one or more near-memory processing commands for the second processor thread after all of the near-memory processing commands in a near-memory processing command sequence for the first processor thread have been issued.

14. The processor of claim 13, wherein the memory controller is further configured to identify a last near-memory processing command in the one or more near-memory processing commands for the first processor thread based upon one or more of:

one or more bit values in the last near-memory processing command or a near-memory processing command that is designated as the last near-memory processing command for the first processor thread.

15. The processor of claim 10, wherein the memory controller is further configured to:
   cause a data stored in a local storage of a near-memory processing element for the first processor thread to be stored to an other location,
   upon completion of a near-memory processing command sequence for a third processor thread:
      cause the data that was stored in the other location to be reloaded into the local storage of the near-memory processing element for the first processor thread, and
      resume processing of the one or more near-memory processing commands for the first processor thread.

16. The processor of claim 10, wherein the memory element is one or more registers.

* * * * *